(12) United States Patent
Payne et al.

(10) Patent No.: US 6,401,832 B1
(45) Date of Patent: Jun. 11, 2002

(54) AGRICULTURAL IMPLEMENT LIFT WHEEL STRUCTURE

(75) Inventors: David Alan Payne, Urbandale; Brian Thomas Mosdal, Ankeny; Anthony Scott Royer, Adel; Paul David Parker, Ankeny; James Thomas Noonan, Johnston, all of IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/550,979

(22) Filed: Apr. 17, 2000

(51) Int. Cl.$^7$ ................................................ A01B 63/00
(52) U.S. Cl. ..................... 172/238; 172/392; 172/417; 172/669; 172/776; 172/452
(58) Field of Search .............................. 172/799.5, 238, 172/310, 311, 395, 401, 452, 669, 677, 407, 413, 414, 417, 776, 307, 216, 484

(56) References Cited

U.S. PATENT DOCUMENTS

| | | | |
|---|---|---|---|
| 3,633,679 A | * 1/1972 | Dahlberg | 172/417 |
| 3,731,749 A | * 5/1973 | Sullivan et al. | |
| 4,379,673 A | * 4/1983 | Takahashi et al. | 172/273 |
| 4,506,609 A | * 3/1985 | Fuss et al. | 111/52 |
| 4,693,331 A | * 9/1987 | Johnson et al. | 180/135 |
| 5,228,522 A | * 7/1993 | Stufflebeam et al. | 172/413 |
| 5,409,069 A | * 4/1995 | Hake | 172/400 |
| 5,957,218 A | * 9/1999 | Noonan et al. | 172/311 |
| 5,988,293 A | * 11/1999 | Brueggen et al. | 172/414 |
| 6,068,062 A | * 5/2000 | Brueggen et al. | 172/311 |
| 6,076,611 A | * 6/2000 | Rozendaal et al. | 172/4 |
| 6,098,719 A | * 8/2000 | Turner | 172/307 |

FOREIGN PATENT DOCUMENTS

| | | | |
|---|---|---|---|
| FR | 2622385 | * | 5/1989 |
| JP | 150583 | * | 6/1991 |

\* cited by examiner

Primary Examiner—Thomas B. Will
Assistant Examiner—Nathan Mammen

(57) ABSTRACT

Lift wheel structure for an implement includes four bar linkage having a curved lower link connected to the frame closely adjacent a first tool-carrying rank. A caster wheel is supported at the forward end of the linkage for castering in an accommodation area defined by the curved lower link. Plates are bolted to the sides of the lower link and extend along sides of an upper link to a connection with a lift cylinder directly above the upper link. The link and the cylinder closely overlie the frame to limit interference with other components mounted above the frame and to facilitate compact folding of implement sections. Loads, including cylinder lift loads, are transmitted primarily through the lower link. A protected transducer assembly is connected between the lower link and the frame to maximize and linearize transducer response in the depth control range. The lift wheel structure can by mounted at different locations on the frame to accommodate different tool configurations and provide the desired automatic depth control and leveling functions. In one embodiment a tension link connects a forward four bar linkage wheel structure with a rear single pivot lift wheel structure such that level lift is provided.

14 Claims, 4 Drawing Sheets

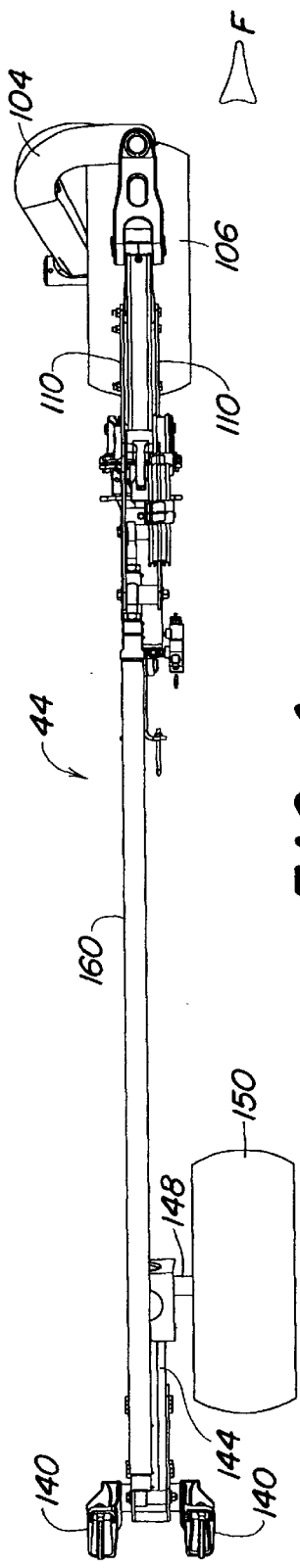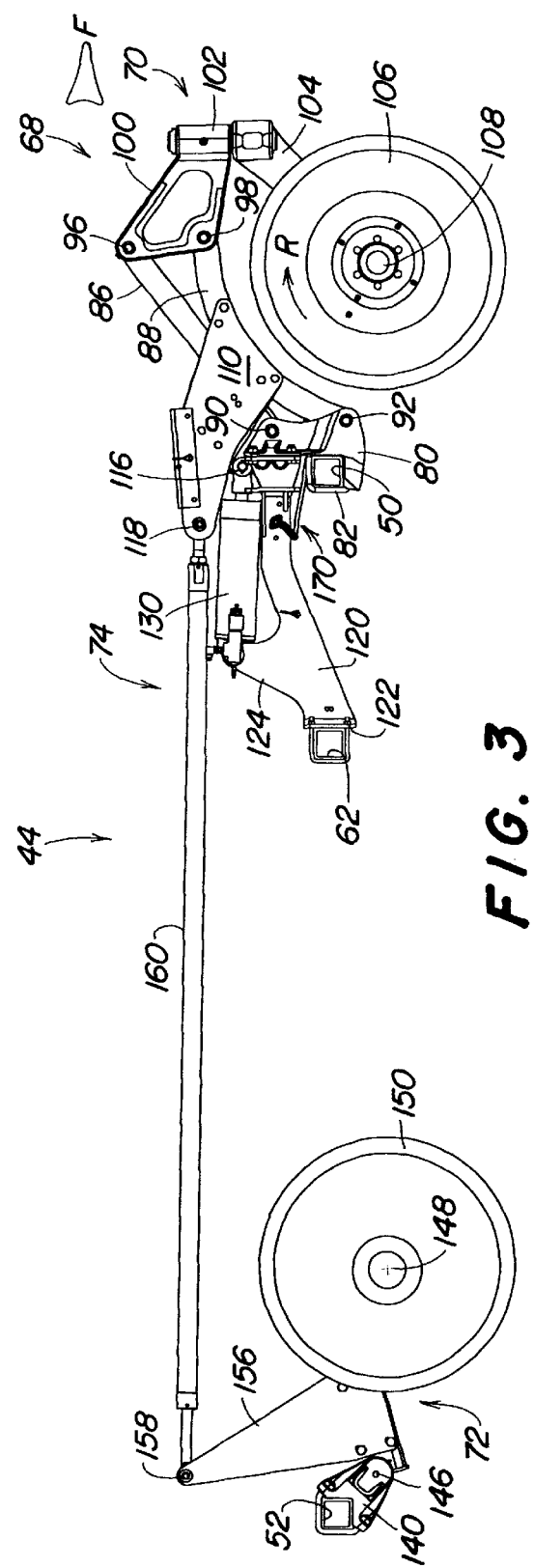

AGRICULTURAL IMPLEMENT LIFT WHEEL STRUCTURE

BACKGROUND OF THE INVENTION

1. Field of the Invention

The present invention relates generally to agricultural implements and, more specifically, to lift wheel structure for an implement frame.

2. Related Art

Implements such as chisel plows and field cultivators have in the past utilized lift wheels connected to a rockshaft assembly on the main frame. The rockshaft assembly is expensive and bulky and often interferes with placement of the implement tools at the desired location on the frame. As a result of permanently mounted lift assembly components, implement versatility is compromised and the number of available tool spacings is reduced. A large tube is required to avoid excessive tube wind up and adds weight to the rear portion of the implement. A compression link operably connects the rockshaft lift wheels with forward wheels to maintain the implement level over a range of vertically adjusted positions. The compression link must be strong to avoid bending under compressive loads and therefore increases costs and adds more weight towards the rear of the implement. The shift of the center of gravity makes the implement back heavy so the front of the frame lifts, especially if additional tools are supported from the rear of the implement. With many lift wheel configurations, the hydraulic cylinders and supports are located behind the center of gravity of the implement, further increasing rear weight distribution.

The front lift wheel assemblies often include four bar linkages having a top bar connected to the compression link or to a cylinder and a bottom bar which is loaded by the weight of the implement and by any additional down forces caused by the tools being drawn into the soil during field working operations. Both bars have to be relatively heavy to handle the respective loads of the lift cylinder or link and the implement weight. Many of the presently available lift wheel assemblies include connecting linkages and cylinders which are offset a substantial distance above the frame and cause interference problems when outer wing sections are folded over the frame for transport. The linkages on wing sections also can also cause interference problems on implements such as five-section machines where the inner and outer wings on each side are pivoted in close proximity during transport. The wheel linkage structures at the front and rear of an implement often have different configurations, and maintaining the implement level in the fore-and-aft direction with mechanically connected lift wheels has been a continuing problem. Some lift wheel assemblies, including those which move vertically by rocking about a single pivot axis, require a considerable amount of fore-and-aft extending space for their full range of vertical motion and further limit the placement of tools on the implement frame. Implements which include electronically controlled depth adjustment often fail to have a convenient and protected location for a potentiometer or other type of transducers located on or adjacent the lift wheel assembly. Linearizing and maximizing movement of a transducer such as a rotary potentiometer in the field working position of the implement continues to be a problem.

BRIEF SUMMARY OF THE INVENTION

It is therefore an object of the present invention to provide an improved lift wheel structure for an implement. It is another object of the invention to provide such a lift wheel structure which overcomes most or all of the aforementioned problems.

It is a further object of the present invention to provide an improved lift wheel structure for an implement having a reduced profile so that interference problems are reduced. It is another object to provide such a structure which increases tool spacing options.

It is still another object of the present invention to provide a lift wheel structure for an implement having an improved four bar linkage. It is another object to provide such a structure which requires a relatively small fore-and-aft dimension for operation over its entire range of vertically adjusted positions. It is a further object to provide such a structure wherein substantially all the heavy loading of the linkage including lift and support loads is borne by the lower link. It is still another object to provide such a linkage which is supported closely adjacent a frame tube and which includes a curved lower link to provide a wheel accommodation space.

It is a further object to provide an improved lift wheel structure which eliminates rockshafts and which can be easily mounted at different locations on the frame. It is a further object to provide such a structure which provides better implement weight distribution and reduces weight at the rear of the implement. It is another object to provide such a structure which eliminates compression links and permits use of shorter frames.

A lift wheel structure constructed in accordance with the teachings of the present invention includes a module type of configuration which can be mounted at different locations along an implement frame. A four bar linkage including a curved lower link is connected to the frame closely adjacent a first tool-carrying rank. A caster wheel is supported at the forward end of the linkage for castering in an accommodation area defined by the curved lower link. Plates are bolted to the sides of the lower link and extend along sides of an upper link to a connection with a lift cylinder directly above the upper link. The lift cylinder is mounted on a support which has an aft portion connected to the rank rearwardly adjacent the first rank and a forward end connected to a casting which pivotally connects the rear pivots of the four bar linkage to the first rank.

The plates extend upwardly from the connection with the cylinder to a pivotal connection with a tension link which extends in the fore-and-aft direction to a connection with a lift wheel assembly which can be either a four-bar arrangement similar to the lift wheel structure describe above or a conventional single arm arrangement. The link and the cylinder closely overlie the frame to limit interference with other components mounted above the frame and to facilitate compact folding of implement sections. The construction eliminates heavy compression links and provides a level lift. The elimination of the rockshaft and rockshaft weldments greatly improves tool and frame component mounting versatility, and the same lift structure module can be used for different implements.

The four-bar linkage provides good vertical lift characteristics with a minimal amount of fore-and-aft space requirements for reduced frame length, improved residue flow and more versatile tool spacing capabilities. A full floating hitch with level lift characteristics eliminates any need for a separate gauge wheel requiring adjustment each time the depth is adjusted. The majority of the linkage loading including that caused by implement weight and tool suction characteristics and lift cylinder lift loading is borne by the lower link, and therefore the upper link can be of a lighter and less costly construction. By connecting the cylinder to the plates extending upwardly from the lower link, the proper moment arm for the cylinder and the necessary arm length for proper front and rear wheel movement are provided without substantial projection of lift assembly components above the frame. The wheel accommodation space opens in the forward direction of tire rotation so that mud is scraped from the wheel and does not wedge between the wheel and upper portion of the curved link. The rear pivot mounting for the four-bar linkage provides a protected space for the rod connecting the wheel position transducer to the lower link. The transducer rod is connected to the link at a point which is at the top of the arc of travel above the lower link pivot to maximize fore-and-aft linear motion in the field working range of the lift wheel. Without the full floating hitch, the operator would possibly have to have a gauge wheel. If this is the case, the operator would then be required to adjust (manually) the gauge wheel each time he adjusted the depth.

These and other objects, features and advantages of the present invention will become apparent to one skilled in the art upon reading the following detailed description in view of the drawings.

BRIEF DESCRIPTION OF THE DRAWINGS

FIG. 3 is a side view similar to that of FIG. 2 but showing the wheels raised relative to the frame for operation in the field.

FIG. 4 is a top view of the lift wheel structure of FIG. 3.

DETAILED DESCRIPTION OF THE DRAWINGS

Figure 1:
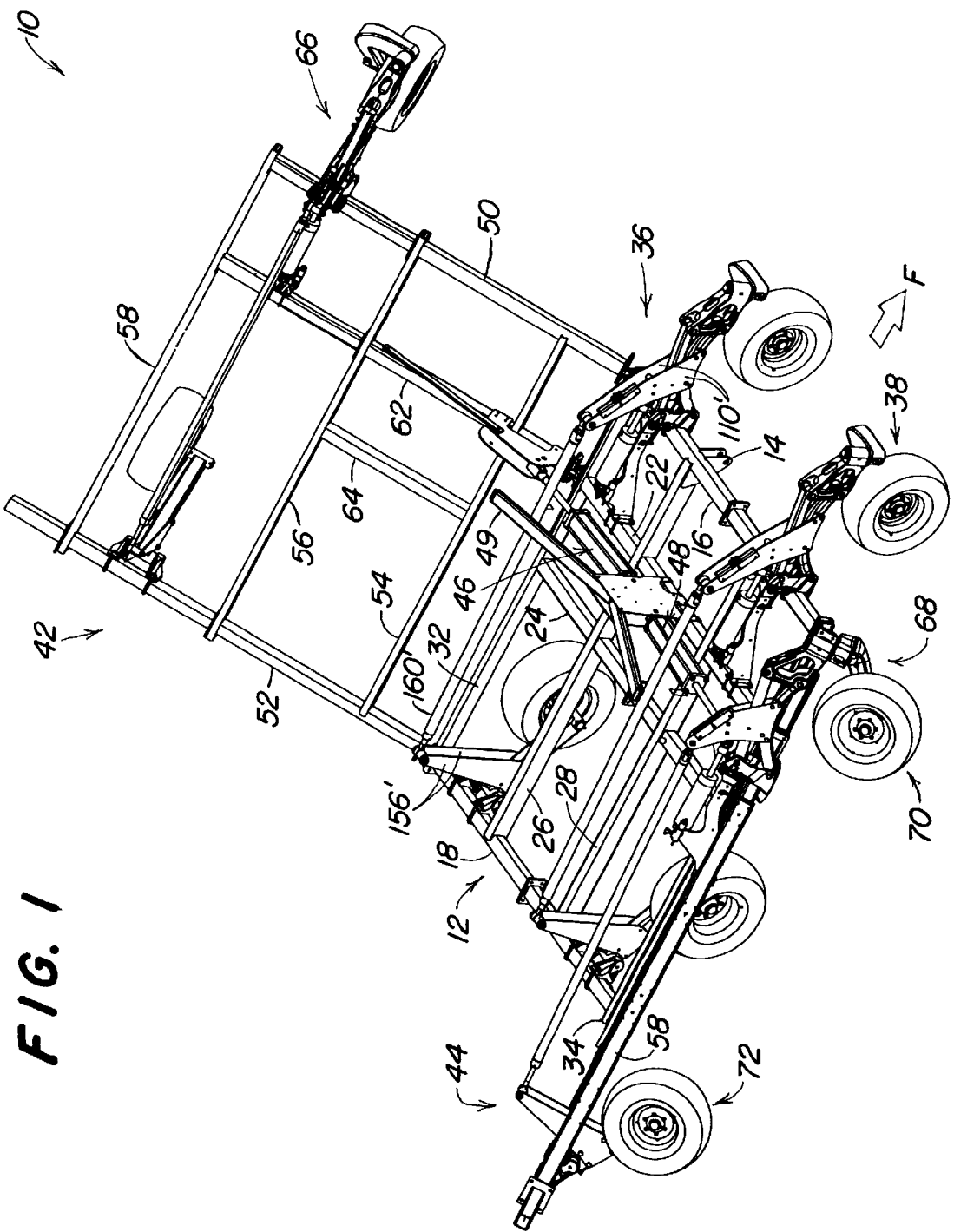
FIG. 1 is a front perspective view of a partially unfolded multi-section implement frame with the lift system of the present invention attached thereto.

Referring now to FIG. 1, therein is shown a multi-section implement 10, such as a field cultivator or chisel plow, with earthworking tools removed. The implement 10 as shown includes a central main frame 12 having forward hitch connecting structure 14 adapted for connection to a towing vehicle by a hitch (not shown) for movement in the forward direction F. The frame 12 includes front and rear transversely extending tubes 16 and 18 and central transversely extending tubes 22 and 24 connected by central fore-and-aft extending beams 26 and 28 and outer end beams 32 and 34. Left- and right-hand lift wheel structures 36 and 38 support the frame 12 above the ground and move the frame vertically between a raised transport position (shown) and a lowered field-working position.

The implement 10 includes left- and right-hand wing sections 42 and 44 having innermost ends hinged to the outer beams 32 and 34, respectively, for rocking between an outwardly extended field-working position and a folded transport position by wing fold structures 46 and 48 connected to the tube 22 and to the respective wing sections 42 and 44. A bump stop assembly 49 is also connected to the frame 12 and helps support the wing sections 42 and 44 in their fully folded positions.

The wing sections 42 and 44 are generally mirror images of each other and include front and rear tubes 50 and 52 connected by fore-and-aft extending beams such as shown at 54, 56 and 58. Central tool-carrying tubes 62 and 64 extend transversely between the beams 54–56 as shown in FIG. 1. Lift wheel structures 66 and 68 are connected near the outer ends of the wing section 42 and 44 for operation generally in unison with the lift wheel structures 36 and 38 for raising and lowering the wing sections with the main frame 12. The construction of the lift wheel structures 36 and 38 is substantially similar to that of the lift wheel structures 66 and 68 with the exception of the offset distance above the frame of fore-and-aft extending linkages for the structures 66 and 68 is greater to accommodate the fold structures 46 and 48 thereunder. Therefore, only the structure 68 will be described in detail below.

The lift wheel structure 68 includes a front four bar linkage mounted caster wheel assembly 70 and a rear single pivot lift wheel assembly 72 connected for operation in unison by linkage structure 74. Although a single pivot assembly is shown at 72, it is to be understood that an assembly of the four bar linkage type generally identical to 70 may be utilized in place of the single pivot assembly. The single pivot assembly 72 is less expensive and when connected as described below provides lift and lower characteristics that closely parallels that of the assembly 70 so that the implement frame remains generally level from front to rear as the wheel assemblies move vertically relative to the frame.

The wheel assembly 70 includes an upright mounting bracket 80 connected by a U-bolt 82 to the front tube 50. The aft ends of fore-and-aft extending upper and lower links 86 and 88 are pivotally connected to the bracket 80 at vertically offset locations 90 and 92 immediately forward of the front face of the tube 50. The forward ends of the links 86 and 88 are pivotally connected at vertically offset locations 96 and 98 to the aft end of a casting 100. The forward end of the casting 100 includes a pivot 102 supporting a caster arm 104 for rocking about an upright axis. The caster arm 104 extends inwardly from the pivot 102 and curves rearwardly and downwardly around the side of a wheel 106 to a connection with hub 108 of the wheel.

As best seen in FIG. 3, the lower link 88 is curved and opens downwardly above the wheel 106 to accommodate castering when the implement is in the lowered position. The space between the outer circumference of the wheel 106 and the bottom of the link 88 increases slightly in the direction of rotation R of the wheel so that the area adjacent the mounting bracket 80 tends to scrape mud and debris that may build up on the wheel 106 in wet conditions and the increased space prevents wedging of remaining material between the wheel and the link 88. The lift wheel structure 68 is designed so that primary loading of the four bar linkage is through the lower link 88, with the upper link maintaining a generally upright orientation of the caster axis.

Figure 2:
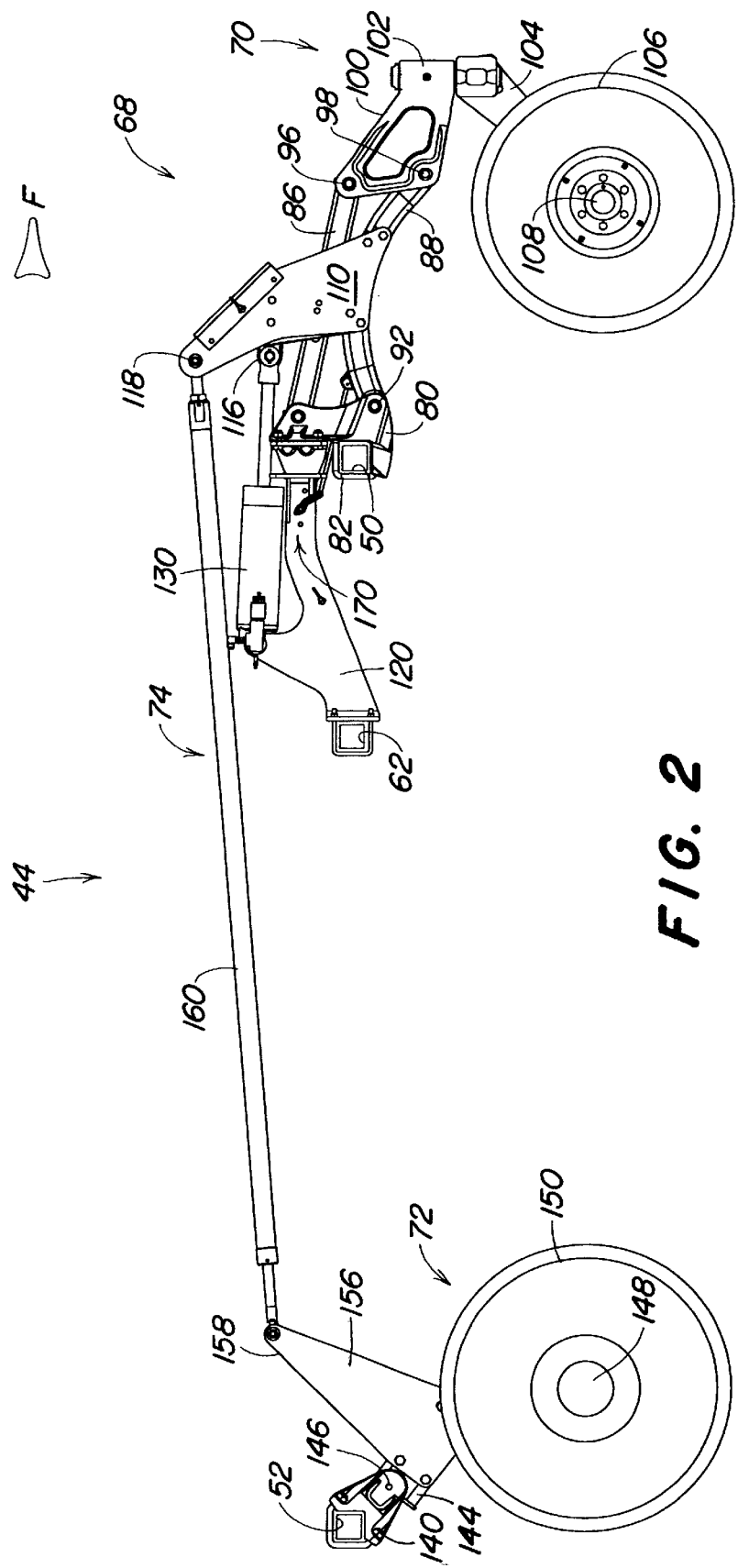
FIG. 2 is a side view of the lift wheel structure utilized on the wing frame of the implement frame of FIG. 1 showing the wheels lowered relative to the frame for transport.

A pair of transversely spaced plates 110 are bolted to the central portion of the lower link 88 and extend upwardly on either side of the upper link 86. The plates 110 rock with the lower link 88 and facilitate movement of the upper link 86 between the plates as the wheel assembly 70 is moved vertically. A rear central portion of the plates 110 is connected to a cylinder rod end attaching mount 116 just above the link 86. The plates 110 extend upwardly and rearwardly from the central portion to a linkage connection 118 located directly above the mount 116 when the lift wheel structure 68 is in the transport position (FIGS. 1 and 2) and rearwardly of the mount 116 when the lift wheel structure 68 is in the field working position shown in FIG. 3.

The upper portion of the bracket 80 is connected to a second bracket 120 which extends rearwardly over the tube 50 and then rearwardly and downwardly to a connection with forward face of the tube 62 via U-bolt bracket 122. A cylinder mounting portion 124 extends upwardly from an aft portion of the bracket 122 and supports the base end of a lift cylinder 130. The rod end of the cylinder 130 is connected to the rod end attaching mount 116. Extending the cylinder (FIG. 2) pivots the lower link 88 downwardly about the location 92, while retracting the cylinder (FIG. 3) pivots the link 88 upwardly. As can be appreciated from FIGS. 2 and 3, the cylinder 130 extends generally parallel to and is offset only slightly above the frame section to which it is attached in the extreme positions shown as well as in intermediate positions to provide a very compact arrangement. By attaching the cylinder 130 to the lower link 88 via plates 110, the necessary offset for the moment arm is provided without raising the mount 116 substantially above the upper link 86. Also, the upward offset of the linkage connection 118 relative to the frame is minimized, and the curved configuration of the rear edges of the plates 110 provides a compact configuration of the plates 110, cylinder 130 and linkage structure 74 in the field working position (FIG. 3).

The rear wheel assembly 72 includes a bracket 140 connected to the rear tube 52. The bracket 140 pivotally supports a wheel arm 144 for rocking about a pivot at location 146 located downwardly and forwardly of the front face of the tube 52. The wheel arm 144 extends downwardly and forwardly (FIG. 2) to a hub 148 mounting a rear wheel 150 for rotation about a transverse axis. A pair of plates 156 are bolted to the sides of the wheel arm 144 and extend upwardly and forwardly (FIG. 2) to an upper end 158 located above and forwardly of the tube 52 and generally at the same distance above the corresponding frame as the linkage connection 118 on the plates 110. An adjustable length tension link 160 extends between the connection 118 and the upper end 158 and constrains the operation of the lift wheel structures 70 and 72 generally in unison. In both the extreme positions and at any point in between, the link 160 closely overlies the cylinder 130 and is offset only a short distance above the frame. The link 160' (FIG. 1) is offset above the frame 12 by plates 110' and 116' which are slightly higher than the corresponding plates 110 and 116 on the wing sections to provide necessary clearance for the wing fold structures 46 and 48.

Figure 5:
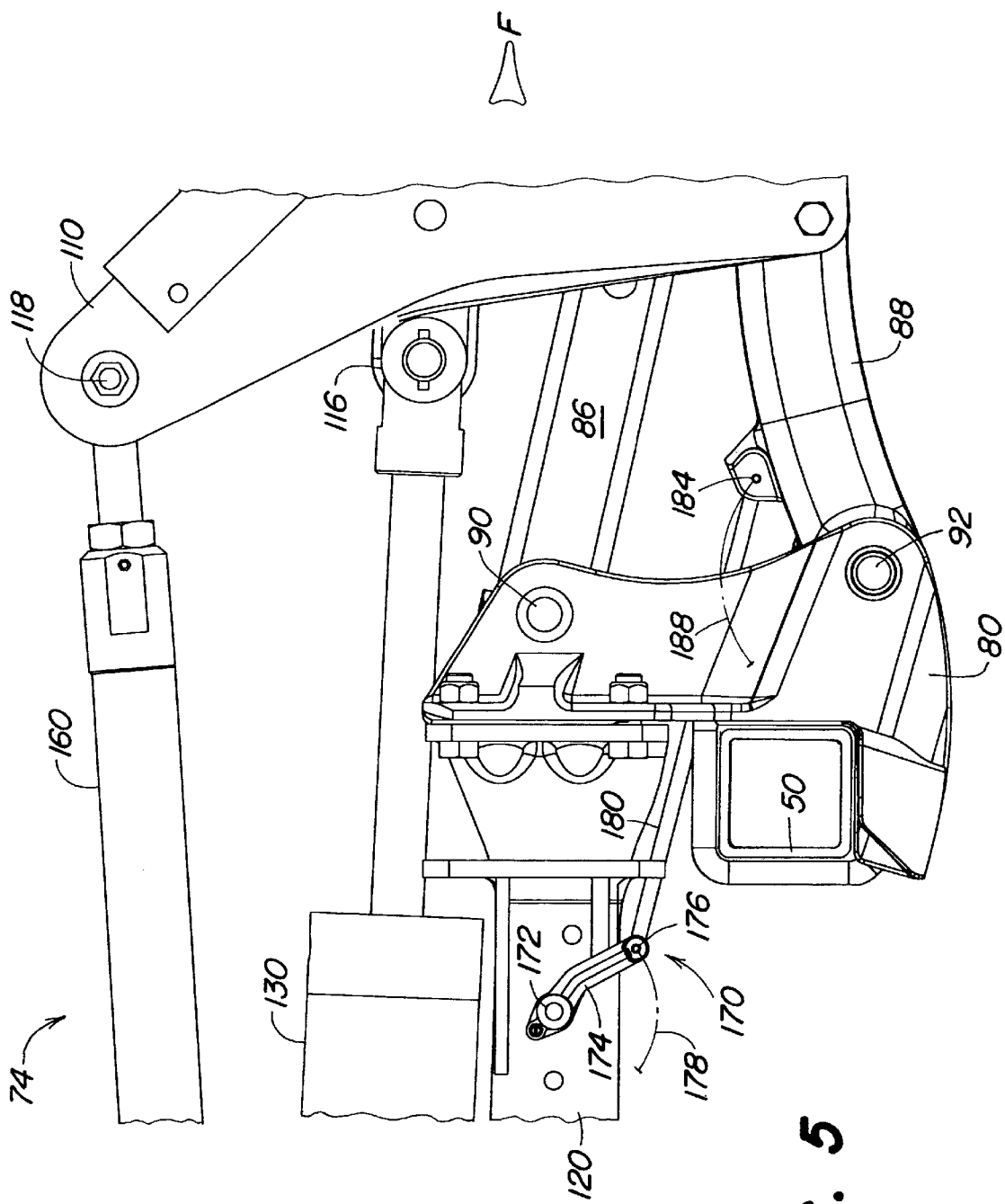
FIG. 5 is an enlarged side view of the area of connection of the lift wheel assembly to the forward portion of frame and showing details of the transducer assembly mounting.

A transducer assembly 170 (FIG. 5) is connected between the second bracket 120 and the lower link 88 to provide feedback for an automatic depth control mechanism which may be generally of the type shown in commonly assigned U.S. Pat. No. 5,957,218. The assembly 170 includes a rotary potentiometer 172 having an arm 174 with a distal end 176 movable through an arc indicated at 178. The distal end 176 is connected by a link 180 to a connection with the lower link 88 by a pivot at 184 offset slightly forwardly and above the pivotal axis at location 92. The link 180 extends between opposite sides of the bracket 80 for protection. The pivot at 184 moves through an arc 188 as the lower link 88 pivots from the transport position (shown) in the counterclockwise direction to the fully raised position. The points 176 and 184 are so located that the arcs 178 and 188 are generally centered about central over-center positions to maximize and linearize transducer motion in the operating positions during field working operations. The above-described configuration also protects the transducer assembly 170 since the transducer components are closely surrounded by but offset from major components on the implement. The potentiometer 172 provides a wheel position signal to the depth control mechanism so that wheel position and tool penetration depth can be selected and automatically maintained. If independent front and rear wheel control is desired, the wheel assembly 72 and linkage 74 may be replaced with a wheel assembly generally identical to the wheel assembly 70 and controlled individually with the controller. The mounting configuration for the assembly 70 provides versatility for mounting the lift wheel structure at different locations on the frame to accommodate the desired tool spacing on the tubes.

Having described the preferred embodiment, it will become apparent that various modifications can be made without departing from the scope of the invention as defined in the accompanying claims.

What is claimed is:

1. A lift wheel assembly for the frame of an agricultural implement adapted for forward movement over the ground, the lift wheel assembly comprising:

a mount adapted for connection to the frame;

a four-bar linkage including an upper link and a lower link, the links having proximate ends pivotally connected to the mount at vertically offset first pivot locations, and distal ends;

a wheel mount pivotally connected to the distal ends of the links at vertically offset second pivot locations;

a ground engaging wheel connected to the wheel mount; wherein the lower link comprises a fore-and-aft extending member having curved central portion opening downwardly away from the upper link and defining a wheel accommodating space below the four-bar linkage;

a lift arm fixed to the curved central portion of the lower link and extending upwardly adjacent the upper link to an upper end portion above the upper link; and a motor connected to the upper end portion and operable to pivot the lower link between a transport position and a field-working position, so that substantially all loading between the wheel during operation of the motor is transmitted through the lower link.

2. The lift assembly as set forth in claim 1 wherein the wheel accommodating space below the four-bar linkage conforms to the shape of the wheel and receives the wheel in the curved central portion.

3. The lift assembly as set forth in claim 1 wherein the curved central portion is offset above a line connecting the first and second pivot locations of the lower link.

4. The lift assembly as set forth in claim 1 wherein the mount includes cylinder support structure, the motor comprises an extendible and retractable cylinder connected to the cylinder support, and wherein the cylinder support structure comprises a bracket fixed between fore-and-aft spaced portions of the frame.

5. The lift assembly as set forth in claim 4 wherein the cylinder remains generally horizontal during extension and retraction.

6. The lift assembly as set forth in claim 5 including a second wheel connected to a transverse tube, the second wheel offset in the fore-and-aft direction from the ground engaging wheel and pivotable vertically, a wheel link extending upwardly from the second wheel for pivoting with the wheel, and a fore-and-aft tension link connecting the wheel link and the lift arm, wherein the tension link and the cylinder lie closely adjacent to each other and remain generally parallel to each other over a range of operation.

7. The lift assembly as set forth in claim 1 including a second wheel offset in the fore-and-aft direction from the ground engaging wheel and pivotable vertically, a wheel link extending upwardly from the second wheel for pivoting with the wheel, and a fore-and-aft tension link connecting the wheel link and the lift arm.

8. The lift assembly as set forth in claim 7 including a four-bar linkage connecting the second wheel to the frame.

9. The lift assembly as set forth in claim 7 including a single wheel arm pivotally connected to the frame and supporting the second wheel for pivoting vertically about an axis transverse to the forward direction.

10. The lift assembly as set forth in claim 1 wherein the mount includes a bracket extending upwardly from the frame, a connecting member having a forward end connected to the bracket, an aft end connected to the cylinder and supporting the cylinder in generally parallel relationship to the frame directly above the frame and below the upper end portion of the lift arm.

11. A lift wheel assembly for the frame of an agricultural implement adapted for forward movement over the ground, the lift wheel assembly comprising:

a mount adapted for connection to the frame;

a four-bar linkage including an upper link and a lower link, the links having proximate ends pivotally connected to the mount at vertically offset first pivot locations, and distal ends, wherin the lower link comprises a curved member having a wheel accommodation space;

a wheel mount pivotally connected to the distal ends of the links at vertically offset second pivot locations;

a ground engaging wheel connected to the wheel mount;

a lift arm fixed to the lower link and extending upwardly adjacent the upper link to an upper end portion above the upper link;

a motor connected to the upper end portion and operable to pivot the lower link between a transport position and a field-working position, so that substantially all loading between the wheel during operation of the motor is transmitted through the lower link;

wherein the curved member includes a central portion connected to the lift arm at a connecting location offset above a line connecting the first and second pivot locations of the lower link; and wherein the accommodation space is curved in an arc complimentary to a circumference of the ground engaging wheel and is offset from the ground engaging wheel, the ground engaging wheel having a forward direction of rotation, and wherein the distance of offset increases in the direction of rotation of the wheel to prevent dirt and debris from lodging between the ground engaging wheel and the lower link.

12. A lift wheel assembly for the frame of an agricultural implement adapted for forward movement over the ground, the lift wheel assembly comprising:

a mount adapted for connection to the frame;

a four-bar linkage including an upper link and a lower link, the links having proximate ends pivotally connected to the mount at vertically offset first pivot locations, and distal ends;

a wheel mount pivotally connected to the distal ends of the links at vertically offset second pivot locations;

a ground engaging wheel connected to the wheel mount;
wherein the lower link includes a curved central portion opening downwardly away from the upper link and defining a wheel accommodating space below the four-bar linkage;

a lift arm fixed to the curved central portion of the lower link;

a motor connected to the upper end portion and operable to pivot the lower link between a transport position and a field-working position, so that substantially all loading between the wheel during operation of the motor is transmitted through the lower link; and wherein the lift arm comprises a pair of spaced plates connected to opposite sides of the lower link and extending upwardly on opposite sides of the upper link.

13. The lift assembly as set forth in claim 12 further comprising a transducer assembly connected between the frame and the lower link for providing an indication of the position of the ground engaging wheel relative to the frame.

14. The lift assembly as set forth in claim 13 including a transducer connection on the lower link rotatable with the lower link about an arc which is centered above the pivot location for the lower link to maximize and linearize transducer motion and provide protection for the transducer.

* * * * *